United States Patent
Ishikura et al.

(10) Patent No.: US 9,642,097 B2
(45) Date of Patent: May 2, 2017

(54) COMMUNICATION SYSTEM, MOBILE STATION APPARATUS, AND COMMUNICATION METHOD

(71) Applicant: Sharp Kabushiki Kaisha, Osaka-shi, Osaka (JP)

(72) Inventors: Katsutoshi Ishikura, Osaka (JP); Hiroyuki Saga, Osaka (JP); Hirokazu Kobayashi, Osaka (JP); Fumiyo Satoh, Osaka (JP); Shigeto Suzuki, Osaka (JP); Yuhsuke Takagi, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 14/915,918

(22) PCT Filed: Sep. 19, 2014

(86) PCT No.: PCT/JP2014/074836
§ 371 (c)(1),
(2) Date: Mar. 2, 2016

(87) PCT Pub. No.: WO2015/041319
PCT Pub. Date: Mar. 26, 2015

(65) Prior Publication Data
US 2016/0198418 A1    Jul. 7, 2016

(30) Foreign Application Priority Data
Sep. 20, 2013    (JP) ................................ 2013-195853

(51) Int. Cl.
*H04B 7/00*    (2006.01)
*H04W 52/34*    (2009.01)
(Continued)

(52) U.S. Cl.
CPC ....... *H04W 52/346* (2013.01); *H04W 52/143* (2013.01); *H04W 52/146* (2013.01); *H04W 52/225* (2013.01); *H04W 52/34* (2013.01)

(58) Field of Classification Search
CPC ........... H04W 52/343; H04W 72/0473; H04W 72/1215; H04W 52/244; H04W 72/0413;
(Continued)

(56) References Cited

U.S. PATENT DOCUMENTS

| 2013/0028209 A1 | 1/2013 | Kishiyama et al. |
| 2013/0053088 A1* | 2/2013 | Thorson .................. H04B 1/525 455/522 |
| 2014/0050205 A1* | 2/2014 | Ahn .................... H04W 52/146 370/336 |

FOREIGN PATENT DOCUMENTS

JP    2013-102551 A    5/2013

OTHER PUBLICATIONS

Official Communication issued in International Patent Application No. PCT/JP2014/074836, mailed on Nov. 4, 2014.
(Continued)

*Primary Examiner* — Tu X Nguyen
(74) *Attorney, Agent, or Firm* — Keating & Bennett, LLP

(57) ABSTRACT

A mobile station device is provided with a communication unit for simultaneously executing a first communication with a first base station device executed over a first frequency band, and a second communication with a second base station that differs from the first base station apparatus over a second frequency band that differs from the first frequency band, and a control unit for adjusting individual ones of a first transmission power and second transmission power on the basis of both the first transmission power,
(Continued)

which is used for the first communication, and the second transmission power, which is used for the second communication.

5 Claims, 6 Drawing Sheets

(51) Int. Cl.
*H04W 52/14* (2009.01)
*H04W 52/22* (2009.01)

(58) Field of Classification Search
CPC ... H04W 88/02; H04W 52/16; H04W 84/045; H04L 2025/03522
USPC .............................. 455/522, 443, 444, 448
See application file for complete search history.

(56) References Cited

OTHER PUBLICATIONS

Renesas Mobile Europe, "Discussion on UL transmission of dual connectivity", 3GPP TSG-RAN WG2 Meeting #81bis, R2-131175, Apr. 15-19, 2013, 3 pages.
Pantech, "Challenge on UL transmission of dual connectivity", 3GPP TSG-RAN WG2 Meeting #83, R2-132504, Aug. 19-23, 2013, pp. 1-8.

* cited by examiner

COMMUNICATION SYSTEM, MOBILE STATION APPARATUS, AND COMMUNICATION METHOD

TECHNICAL FIELD

The present invention relates to a communication system, mobile station apparatus, and communication method.

The present application claims priority based on the patent application No. 2013-195853 filed in Japan on Sep. 20, 2013 and incorporates by reference herein the content thereof.

BACKGROUND ART

At present, in LTE-A (Long Term Evolution-Advanced), a CA (Carrier Aggregation) is standardized.

The CA is the technology that realizes high speed and large capacity communication in 3GPP Release 10/11.

The CA is the technology that simultaneously transmits/receives a signal using continuous or discontinuous multiple carriers (CC: component carrier) in frequency direction.

According to the standard of the CA, a terminal (also referred to as a mobile station or a mobile station apparatus) executes the CA (intra site CA) on an uplink (a transmission from the terminal to a base station) with the single base station (also referred to as a base station apparatus). Therefore, a single scheduler allocates a resource of the uplink and monitors the power (for example, the PL 1).

On the other hand, since the 3GPP Release 12, on the uplink, a dual connection, which the terminal establishes communication connection with both a macro base station and a small base station, is being investigated.

Also, the terminal, which executes the CA with the macro base station and the small base station on the uplink (inter site CA), is being investigated.

Here, it is proposed that the respective macro base stations and the small base stations independently executes an uplink scheduling control, by considering a delay occurred in a network (backhaul) between the macro base station and the small base station (for example, NPL 1).

CITATION LIST

[Patent Document]
[Patent Document 1] JP2013-102551A
[Non Patent Document]
[Non Patent Document 1] 3GPP TSG-RAN WG2 Meeting #81bis "Discussion on UL transmission of dual connectivity" (URL: http://www.3gpp.org/ftp-tsg_ran/WG2_RL2/TSGR2_81bis/Docs/R2-131175.zip)

DISCLOSURE OF THE INVENTION

Problems to be Solved by the Invention

However, in the case that the multiple base stations (for example, the macro base station and the small base station) execute the independent uplink scheduling control, the respective base stations may substantially simultaneously execute the uplink resource allocation.

In this case, the uplink resource allocation in which the uplink transmission power of the terminal exceeds the maximum value may be executed. In other words, the transmission power management in the communication system may be difficult.

An aspect of the present invention is a communication system, a mobile station apparatus, and a communication method capable of controlling the transmission power of the terminal.

Means for Solving the Problems

The present invention is devised to resolve the foregoing problem. According to an aspect of the present invention, there is provided a communication system including a first and a second base station apparatus and a mobile station apparatus, the mobile station apparatus preferably including: a communication unit that executes a first communication using a first frequency band over the first base station, and executes a second communication using a second frequency band that differs from the first frequency band over the second base station. The first communication and the second communication may simultaneously execute, and a control unit that adjust individual ones of the first transmission power based on both the first transmission power used in the first communication and the second transmission power used in the second communication.

Effects of the Invention

According to the present invention, it is possible to manage the transmission power of the terminal.

MODE FOR CARRYING OUT THE INVENTION

Figure 1:
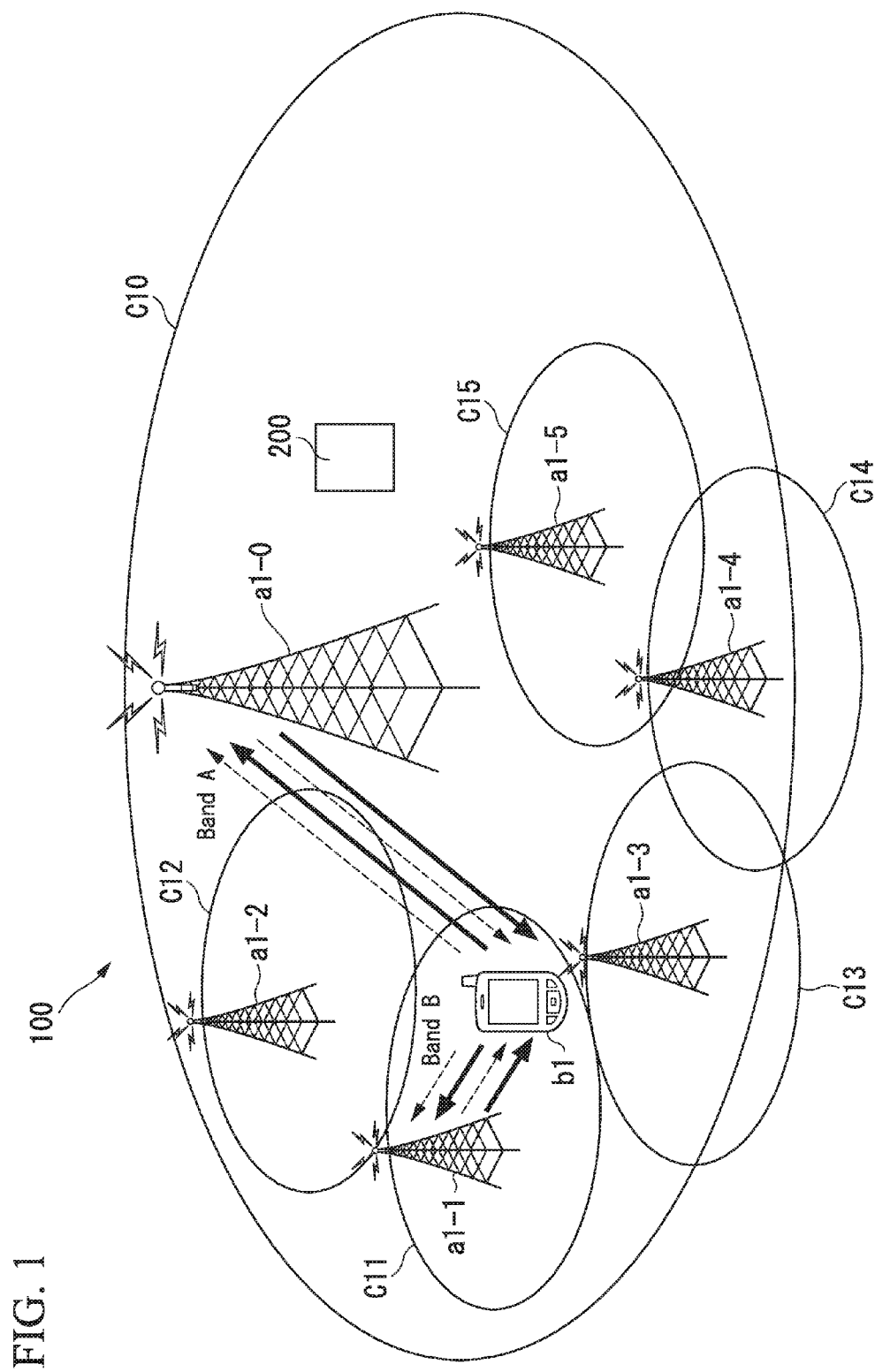
FIG. 1 is a schematic diagram showing a communication system in an embodiment of the present invention.

Respective embodiments of the present invention will be described below in detail referring to the drawings.

FIG. 1 is a schematic diagram showing a communication system 100 in the embodiment of the present invention.

The communication system 100 includes a macro base station a1-0, a small base stations (also, referred to as a pico base station) a1-1, a1-2, a1-3, a1-4, and a1-5, and a terminal b1. The terminal b1, for example, may be a mobile station apparatus, such as a mobile telephone apparatus and a tablet terminal apparatus.

FIG. 1 shows the base stations a1-0, a1-1, a1-2, a1-3, a1-4, and a1-5, and the terminal b1 in the communication system 100 of the LTE.

Respective ellipses C10, C11, C12, C13, C14, and C15 illustrated in FIG. 1 show a cell area (communication area) of the respective base stations a1-0, a1-1, a1-2, a1-3, a1-4, and a1-5.

The cell C10 is a macro cell.

The cells C11 to C15 are small cells.

The cell area of the small cell is smaller than that of the macro cell. The part or the whole of the area of the small cells may be overlapped with the area of the macro cell.

Also, FIG. 1 shows the case that the number of the base station and the cell area is six, and may be except for six.

In FIG. 1, the terminal b1 executes the CA (Carrier Aggregation) using the macro base station a1-0 and the small base stations a1-2, a1-2, a1-3, a1-4, and a1-5, and the respective single CC (Component Carrier) allocated to the respective macro base station a1-0 and the small base stations a1-2, a1-2, a1-3, a1-4, and a1-5.

In this way, the CA connected with both of the uplink and the downlink, and with the plurality of base stations, is also referred to as "Inter site CA".

Further, the uplink is communication from the terminal b1 to the base stations a1-0, a1-1, a1-2, a1-3, a1-4, and a1-5. The downlink is communication from the base stations a1-0, a1-1, a1-2, a1-3, a1-4, and a1-5 to the terminal b1.

In the FIG. 1, the terminal b1 communicates with the macro base station a1-0 using the CC of bandwidth 20 MHz of frequency band A.

In this case, the terminal b1 communicates the control signal and the data signal with the macro base station a1-0 on both the uplink and the downlink.

For example, the uplink control signal is allocated on PUCCH (Physical Uplink Control Channel).

Also, the uplink data signal is allocated on PUSCH (Physical Uplink Shared Channel).

On the other hand, the downlink control signal is allocated on PDCCH (Physical downlink control channel), and the downlink data signal is allocated on PDSCH (Physical downlink shared channel).

The base stations a1-0, a1-1, a1-2, a1-3, a1-4, and a1-5 are connected via backhaul, for example, with X interface, with each other.

The base stations a1-0, a1-1, a1-2, a1-3, a1-4, and a1-5 may directly communicate with each other. For example, the macro base station a1-0 may directly communicate with the small base station a1-1. Further, the communication system 100 comprises a management device 200. The management device 200 may communicate with the base stations a1-0, a1-1, a1-2, a1-3, a1-4, and a1-5.

As described above, the communication system 100 comprises the base stations a1-0, a1-1, a1-2, a1-3, a1-4, and a1-5, and the terminal b1. The terminal b1 may directly communicate with one or more of the base stations a1-0, a1-1, a1-2, a1-3, a1-4, and a1-5 by using the CC with each other.

The terminal b1 distributes transmission power using the respective communications based on transmission power in multiple communications.

For example, the terminal b1 may execute simultaneously communication C1 with the macro base station a1-0 using the CC of the frequency band A and communication C2 with the macro base station a1-1 using the CC of frequency band B which is different from the frequency band A.

The base station b1 distributes the transmission power to the communication C1 and to the communication C2, based on the total amount of the transmission power using the communication C1 and C2.

Thus, the transmission power of the terminal 100 may be controlled in the communication system 100.

Further, the frequency band is available frequency band specified in the system.

For example, bandwidth of the frequency band A is 2 GHz, and bandwidth of the frequency band B is 3.5 GHz. The frequency band includes one or more CC.

Figure 2:
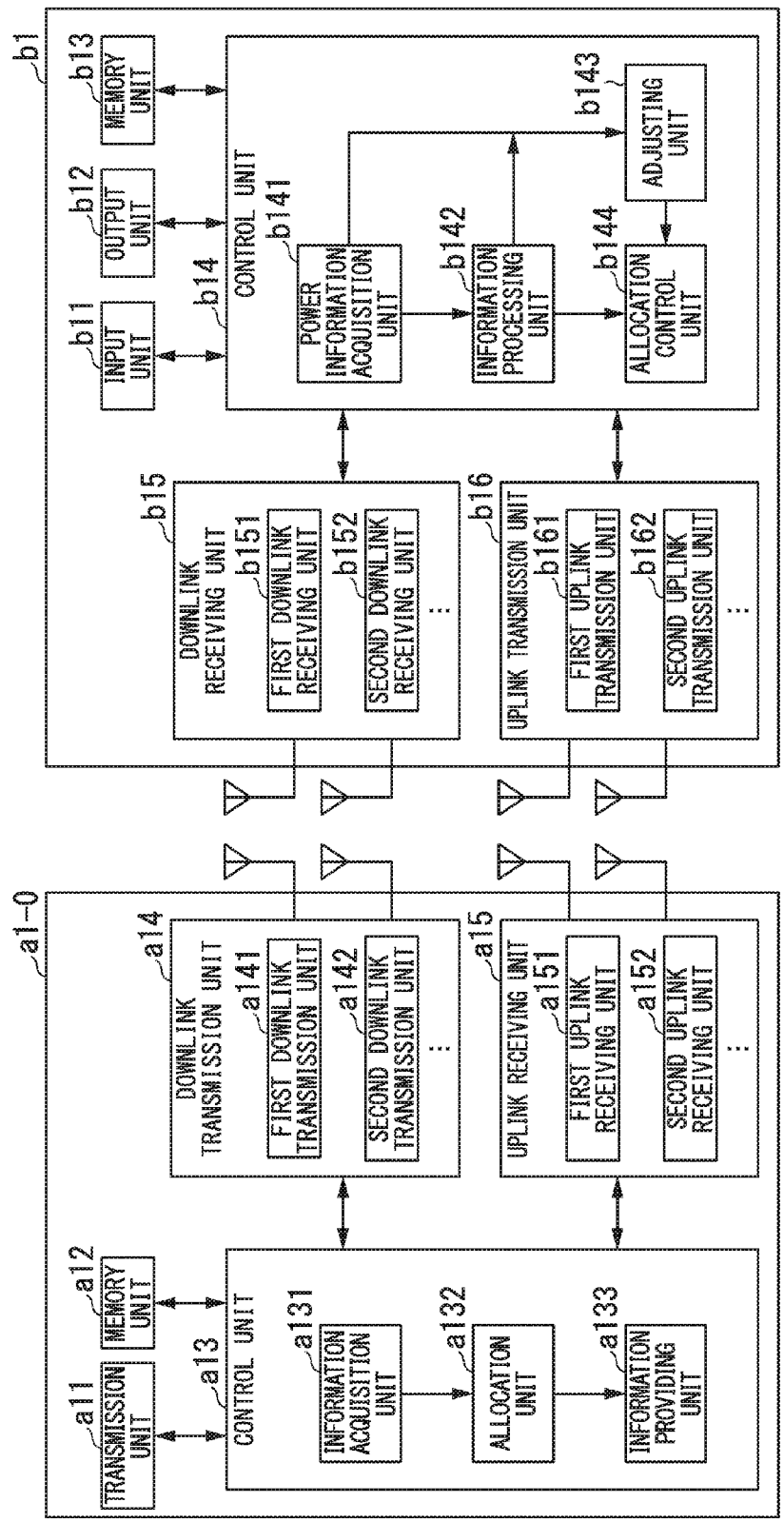
FIG. 2 is a schematic block diagram showing a terminal and respective base stations in a communication system in an embodiment of the present invention.

FIG. 2 is a block diagram showing a schematic configuration of a communication system 100 (FIG. 1) in an embodiment of the present invention. FIG. 2 shows a constitution of the respective base stations a1-0, a1-1, a1-2, a1-3, a1-4, and a1-5, and the terminal b1.

(The Base Stations A1-0, A1-1, A1-2, A1-3, A1-4, and A1-5)

The base station a1-0 includes a communication unit a11, a memory unit a12, a control unit a13, a downlink transmission unit a14, and an uplink receiving unit a15. Further, the configuration of the base stations a1-1, a1-2, a1-3, a1-4, and a1-5 are similar to the configuration of the base station a1-0, and thus the description thereof is omitted.

The communication unit a11 communicates with the management device 200 of a core network and the other base stations.

The memory unit a12 stores an information acquired and generated by the control unit a13.

The control unit a13 controls respective portions of the base stations a1-0, a1-1, a1-2, a1-3, a1-4, and a1-5.

For example, the control unit a13 executes various control related to the communication of the base stations a1-0, a1-1, a1-2, a1-3, a1-4, and a1-5, for example, the process of receiving data and transmission data, and carrier frequency control of the respective transmitting/receiving units.

The control unit a13 includes an information acquisition unit a131, an allocation unit a132, and an information providing unit a133.

The information acquisition unit a131 acquires information. For example, the information acquisition unit a131 acquires the information from the management device 200 or another base stations a1-$m$ via the communication unit a11.

The information acquisition unit a131 acquires the information from the terminal b1 via the uplink receiving unit a15. The information may include, for example, a communication quality information (for example, a channel quality indicator (CQI)), and a power head room (PHR) report, and so on.

The allocation unit a132 allocates the resources (frequency band and time band; for example, a resource block) using the radio communication with the terminal b1 based on the information which the information acquisition unit a131 acquired. The allocation unit a132 generates a resource allocation information indicating the allocated resources.

The information providing unit a133 provides information. For example, the information providing unit a133 provides the information generated by the control unit a13, the information acquired by the information acquisition unit a131, the information stored by the memory unit a12. The information may include, for example, the resource allocation information generated by the allocation unit a132, the information acquired from the base stations a1-$m$, and so on.

The downlink transmission unit a14 transmits the information fed from the control unit a13, to the terminal b1 via the antenna. The downlink transmission unit a14 includes a first downlink transmission unit a141, and a first downlink transmission unit a142.

Moreover, in FIG. 2, in the case that the downlink transmission unit a14 includes the first downlink transmission unit a141 and the second downlink transmission unit a142 was described, the downlink transmission unit a14 may include more downlink transmission unit (for example, a third downlink transmission unit).

For example, the downlink transmission unit a14 may include the first downlink transmission unit a141 and the second downlink transmission unit a142 in each of the frequency bands, the downlink transmission unit a14 may include the first downlink transmission unit a141 and the second downlink transmission unit a142 in the case of transmitting the signal using the frequency band which corresponds to the first downlink transmission unit a141 and the second downlink transmission unit a142.

The uplink receiver unit a15 outputs the information received from the terminal b1 via the antenna to the control unit a13. The uplink receiver unit a15 includes a first uplink receiver unit a151 and a152.

Moreover, in FIG. 2, in the case that the uplink receiving unit a15 includes the first uplink receiving unit a151 and the second uplink receiving unit a152 was described, the uplink receiving unit a15 may include more receiving unit (for example, a third uplink receiving unit).

For example, the uplink receiving unit a15 may include the first uplink receiving unit a151 and the second uplink receiving unit a152 in the respective frequency bands, the uplink receiving unit a15 may include the first uplink receiving unit a151 and the second uplink receiving unit a152 in the case of transmitting the signal using the frequency band which corresponds to the first uplink receiving unit a151 and the second uplink receiving unit a152.

(The Terminal b1)

The terminal b1 includes an input unit b11, an output unit b12, a memory unit b13, a control unit b14, a downlink receiving unit b15, and an uplink receiving unit b16.

The input unit b11 includes a button or a microphone, and a voice input and an user operation is fed into the input unit b11.

The output unit b12 includes a display or a speaker, outputs the information generated by the control unit b14 with graphic and sound.

The memory unit b13 stores the information acquired and generated by the control unit b14.

The control unit b14 controls the respective portions of the terminal b1. For example, the control unit b14 executes various control relating to a terminal communication, for example, processing a receiving data and a transmission data, controls a carrier frequency of the respective transmission/receiving units, and so on.

The control unit b14 includes a power information acquisition unit b141, an information processing unit b142, an adjustment unit b143, and an allocation control unit b144.

The power information acquisition unit b141 acquires the information indicating a transmission power transmitted by the uplink transmission unit b16.

Further, the power information acquisition unit b141 acquires the information indicating a transmission power of the communication with the respective base stations a1-0, a1-1, a1-2, a1-3, a1-4, and a1-5.

However, in each of uplink transmission unit b161 and second uplink transmission unit b162, that is, for example, in each of the frequency bands or the antennas, the power information acquisition unit b141 may acquire an information indicating the base station communicating with these units, and an information indicating transmission power of the communication of each of the units.

Also, the power information acquisition unit b141 may acquire the information indicating the base station using the CC in communication, and the information indicating the transmission power in communication of each of the CCs.

The information processing unit b142 acquires an information. For example, the information processing unit b142 acquires the information indicating an input of an user operation and a voice from the input unit b11. The information processing unit b142 acquires the information from the base station via the downlink receiving unit b15. The information, for example, includes the resource allocation information and so on, received from the base station.

The information processing unit b142 provides the information. For example, the information processing unit b142 provides the information generated or acquired by the information processing unit b142, the information stored in the memory unit b13, to the base station via the uplink transmission unit b16. The information, for example, includes a communication quality information (For example, CQI) and so on, generated by the information processing unit b142.

The adjustment unit b143 adjusts the transmission power of the communication of the uplink transmission unit b16, based on the information acquired by the power information acquisition unit b141 and the information processing unit b142.

Further, the adjustment unit b143 adjusts the transmission power in the respective communications of the base stations a1-0, a1-1, a1-2, a1-3, a1-4, and a1-5.

However, the adjustment unit b143 may adjust the transmission power of the communication of the respective units of the respective first uplink transmission unit b161 and the second uplink transmission unit b162, that is, for example, in each of frequency bands or antennas. Also, the adjustment unit b143 may adjust the transmission power in each of the CC communications.

The adjustment unit b143 may adjust the transmission power of the respective communications by adjusting the amplitude of the signal (change of digital value and modulation scheme) and the allocation of the signal by the allocation control unit b144. Also, the adjustment unit b143 may adjust the transmission power of the respective communications by adjusting the amplifier (amplifier circuit) of the uplink transmission unit b16. The allocation control unit b144 controls the allocation of the signal in the communication with the base station, based on the information generated by the information processing unit b142 and the information (for example, the resource allocation information).

The downlink receiving unit b15 outputs the information received from the base station via the antenna to the control unit b14. The downlink receiving unit b15 comprises a first downlink receiving unit b151 and a second downlink receiving unit b152.

Moreover, in the FIG. 2, the case that the downlink transmission unit b15 includes the first downlink transmission unit b151 and the second downlink transmission unit 152 was described, but the downlink transmission unit b15 may include more than them (for example, a third downlink transmission unit).

For example, the downlink transmission unit b15 may include the first downlink transmission unit b151 and the second downlink transmission unit b152 in each of the frequency bands, the first downlink transmission unit b151 and the second downlink transmission unit b152 may be used in a case of receiving a signal using frequency band which is corresponding to the first downlink transmission unit b151 and the second downlink transmission unit b152.

The uplink transmission unit b16 transmits the information being input from the control unit b14 to the base station via the antenna. The uplink transmission unit b16 includes the first uplink transmission unit b161, and the second uplink transmission unit b162.

Moreover, in the FIG. 2, the case that the uplink receiving unit b16 includes the first uplink receiving unit b161 and the second uplink receiving unit 162 was described, but more of the uplink transmission units b16 may be included (for example, a third uplink receiving unit).

For example, the uplink receiving unit a16 may include the first uplink receiving unit a161 and the second uplink receiving unit a162 in each of the frequency bands. Moreover, the first uplink receiving unit a161 and the second uplink receiving unit a162 may be used in a case of transmitting a signal using the frequency band which is corresponding to the first uplink receiving unit a161 and the second uplink receiving unit a162.

The respective embodiments of the present invention will be described below. In the respective embodiments, the transmission power means the transmission power of the uplink communication. The terminal b1 controls the transmission power of the communication of the uplink transmission. The transmission power may be an average value (mean value) of the transmission power and may be a maximum value of the transmission power. Also, the transmission power may be a reference power as a reference of the transmission power of the signal and the amplifier.

First Embodiment

A first embodiment of the present invention will be described in detail below. The schematic diagram showing the communication system 100, and the block diagram showing the schematic configuration of the terminal and the respective base stations are similar to that in the FIG. 1, and the FIG. 2, and thus the description thereof is omitted.

The first embodiment is the example of the case that the resource allocation is instructed in exceeding of the maximum value of the transmission power of the terminal b1, on the uplink from the terminal b1 to the base station. As an example, in the case that the resource allocation is instructed in exceeding of the maximum value of the transmission power of the terminal b1, the terminal b1 will execute the resource allocation after the power of the uplink is equally reduced. Further, in the first embodiment, the respective base stations a1-0, a1-1, a1-2, a1-3, a1-4, and a1-5 independently allocate the resource to the terminal b1.

Figure 3:
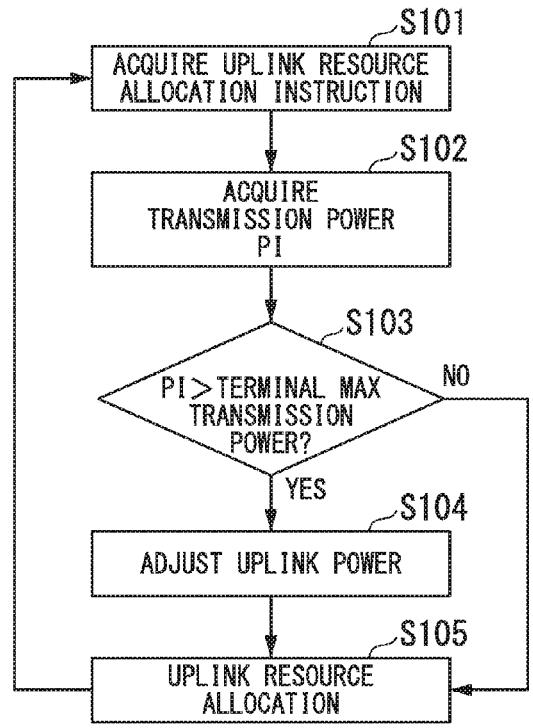
FIG. 3 is a flowchart showing an operation of a terminal in a first embodiment of the present invention.

FIG. 3 is a flowchart showing the operation of the terminal b1 in a first embodiment of the invention.

(Step S101) The information processing unit b142 acquires first resource allocation information from the macro base station a1-0, and acquires second to sixth resource allocation informations from the small base stations a1-1, a1-2, a1-3, a1-4, and a1-5.

For example, in the second resource allocation information, the resource of the frequency band A (reference No. 1) is allocated to the terminal b1. Also, in the third resource allocation information, the resource of the frequency band B (reference No. 2) is allocated to the terminal b1. Thus, the terminal b1 is instructed to allocate the resources. After that, the step goes to the step S102.

(Step S102) The power information acquisition unit b141 acquires the information indicating a transmission power in communication with the macro base station a1-0, and the information indicating the transmission power of the respective small base stations a1-1, a1-2, a1-3, a1-4, and a1-5.

These transmission powers may be the actual transmission power of communications, and may be the transmission power calculated from the resource allocation information.

The information processing unit b142 calculates the total amount Pi of the transmission power of all communications based on the information acquired by the power information acquisition unit b141.

For example, the information processing unit b142 adds the transmission power of the communication with the macro base station a1-0 to the respective transmission powers of the communication with the small base station a1-1, a1-2, a1-3, a1-4, and a1-5, and calculates the total amount Pi of them. After that, the step goes to the step S103.

(Step S103) The information processing unit b142 determines whether the total amount Pi calculated at the step S102 is larger than a threshold stored in the memory unit b13.

This threshold is the max transmission power which is the maximum value of the transmission power of the terminal b1.

Thus, the information processing unit b142 determines whether the resource allocation exceeding the maximum of the transmission power of the terminal b1 was instructed from the macro base station a1-0 and the respective small base stations a1-1, a1-2, a1-3, a1-4, and a1-5.

If the instruction of the resource allocation exceeding the maximum of the transmission power of the terminal b1 was determined, the step goes to the step S104.

On the other hand, if the instruction of the resource allocation within the transmission power of the terminal b1 is determined, the step goes to the step S105.

Further, the maximum transmission power is, for example, the max transmission power determined in each of the terminal b1 described in the 3GPP standard, and the max transmission power to which the terminal b1 may transmit.

For example, in the terminal b1, the average value of the transmission in certain interval (for example, time) must not exceed the maximum of the transmission power.

(Step S104) The adjustment unit b143 calculates the total amount of the transmission power in the case of arranging the signal to the allocated resource based on the multiple resource allocation information, among the first resource allocation information acquired at the step S101 and the resource allocation information of the small base station a1-1, a1-2, a1-3, a1-4, and a1-5.

The adjustment unit b143 reduces the exceeded amount of the transmission power as consequence of the calculation.

Here, the adjustment unit b143 doesn't change the transmission power of the uplink control signal, equally reduces the transmission power of the uplink signal on the respective base stations a1-0, a1-1, a1-2, a1-3, a1-4, and a1-5.

For example, the adjustment unit b143 equally reduces the transmission power of the respective base stations a1-0, a1-1, a1-2, a1-3, a1-4, and a1-5.

Specifically, in the case that the adjustment unit b143 may communicate with N (N is an integer of ≥2) base stations at the same time (execute the CA). The adjustment unit b143 reduces the transmission power of the communication with the respective base stations a1-0, a1-1, a1-2, a1-3, a1-4, and a1-5, by ΔP={(total amount of the transmission power)−(terminal maximum transmission power)}/N.

Otherwise, the adjustment unit b143 may reduce the transmission power of the communication with the respective base stations a1-0, a1-1, a1-2, a1-3, a1-4, and a1-5, in the same proportion, until the total amount of the power do not exceed to the maximum transmission power.

Further, the adjustment unit b143 may reduce the transmission power of the communication with the respective base stations a1-0, a1-1, a1-2, a1-3, a1-4, and a1-5, corresponding to a frequency band and a bandwidth of the CC and a frequency.

Otherwise, the adjustment unit b143 may reduce the transmission power of the CC except for the CC which executes the communication of a radio management control signal such as a handover control.

(Step S105) The allocation control unit b144 allocates the signal on the resources based on the first resource allocation information acquired at the step S101 and the second to sixth resource allocation information.

Here, in the case that the transmission power is adjusted at the step S104, the allocation control unit b144 allocates signals on the resources so as to be an adjusted transmission power.

As described above, in the first embodiment, the control unit b14 distributes the transmission power being used in the respective communications, relating to the communication on the uplink from the terminal b1 to the respective base stations a1-0, a1-1, a1-2, a1-3, a1-4, and a1-5, so that the total amount of the transmission power of all communications become lower than the threshold (maximum transmission power).

Thus, in the communication system 100, the terminal b1 may prevent the resource allocation which the transmission power exceeds the maximum value, and may appropriately manage the transmission power.

Further, the control unit b14 acquires a resource allocation information in the communication with the base stations from the respective base stations a1-0, a1-1, a1-2, a1-3, a1-4, and a1-5.

The control unit b14 presumes the transmission power of each of the communications based on the resource allocation information, calculates a correction value reducing a fixed value ΔP from each of the presumed transmission powers, of which the total amount in all communications become lower than threshold.

The control unit b14 distributes the respective calculated correction values as the transmission power using in each of the communications.

Thus, in the communication system 100, the terminal b1 may equally reduce the transmission power in all communications.

Second Embodiment

The second embodiment of the present invention will be described in detail below. The schematic diagram showing a communication system and the block diagram showing schematic configuration of the communication system 100 are same as FIG. 1 and FIG. 2, and thus the description thereof is omitted.

The second embodiment is an example in a case that the resource allocation which is over the maximum of the transmission power of the terminal b1 is instructed, in the uplink from the terminal b1 to the base station.

As an example, in a case that the resource allocation which is over the maximum of transmission power of terminal b1 is instructed, the terminal b1 selects the base station, and communicates with the selected base station, and stops the communication with the base station which is not selected.

Further, in the second embodiment, the respective base stations a1-0, a1-1, a1-2, a1-3, a1-4, and a1-5 independently allocate the resource which is used in the radio communication with the terminal b1.

Figure 4:
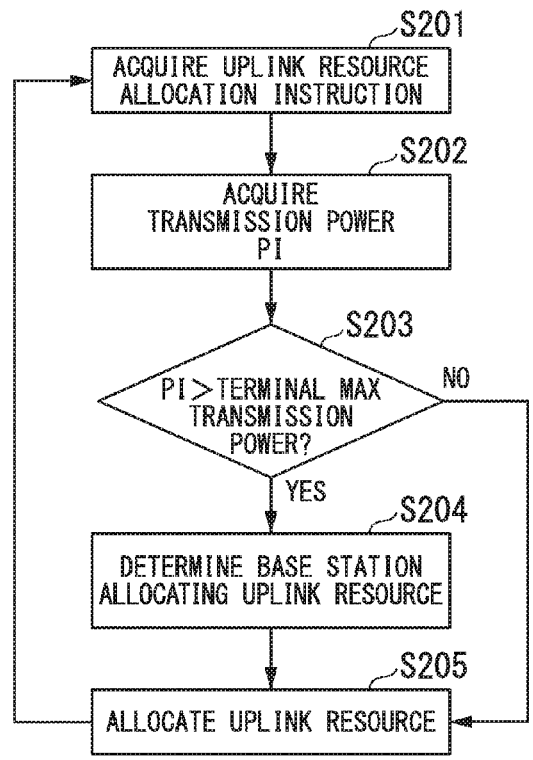
FIG. 4 is a flowchart showing an operation of a terminal in a second embodiment of the present invention.

FIG. 4 is a flowchart showing the operation of the terminal b1 in a second embodiment of the present invention.

The flowchart of the second embodiment (FIG. 4) is different from the flowchart of the first embodiment (FIG. 3) at the step S204, and the step S205. The processes at the other steps are same as the flowchart of the first embodiment, and thus the description thereof is omitted.

(Step S204) The adjustment unit b143 selects one or plurality of base stations like (1a)-(3a) as follows, among the base stations a1-0, a1-1, a1-2, a1-3, a1-4, and a1-5 which are going to communicate.

In this case, the adjustment unit b143 selects one or plurality of base stations among the base stations a1-0, a1-1, a1-2, a1-3, a1-4, and a1-5, so as to the total amount of the transmission power of the communication with the selected one or plurality of base stations is less than the threshold.

This threshold is, for example, the maximum transmission power which is the maximum value of the transmission power of the terminal b1.

(1a) The adjustment unit b143 preferentially selects the base station of which the transmission power is lower.

(2a) The adjustment unit b143 preferentially selects the base station of which the transmission quality is better (For example, pass loss is lower).

(3a) The adjustment unit b143 selects the small base station in preference to the macro base station a1-0.

In the case of the (1a), for example, the adjustment unit b143 preferentially selects the base station which the transmission power is lower, based on the first resource allocation information acquired at the step S101, and the second to the sixth resource allocation information.

In the case of the (2a), for example, the adjustment unit b143 preferentially selects the base station which the transmission quality is better, based on the communication quality information generated by the information processing unit b142.

In the case of the (3a), for example, the adjustment unit b143 selects the small base station based on the information, indicating a category of the respective base stations a1-0, a1-1, a1-2, a1-3, a1-4, and a1-5 (whether the small base station or the macro base station), which the information processing unit b142 acquired.

Thus, the transmission power of the small base station a1-$i$ is commonly lower than that of the macro base station a1-0. Therefore, the adjustment unit b143 selects the base station which the transmission power is lower.

(Step S205) The allocation control unit b144 allocates the signal on the resource, based on the first resource allocation information acquired at step S101, and the second to sixth resource allocation information.

Here, if the base station is selected at the step S304, the allocation control unit b144 allocates the signals on the resources, based on the resource allocation information of the selected base station.

In this way, in the second embodiment, if the total amount of the transmission power of all communications exceeds the threshold, the control unit b14 stops the communication with at least more than one base station.

The terminal b1 may prevent the resource allocation exceeding the maximum of the transmission power, and may appropriately manage the transmission power by not arranging the resource in the communication with certain base station, in the communication system 100.

Further, in the second embodiment, the information processing unit b142 may inform not to allocate the signal on the resource of the uplink, that is, not to execute communication to the base station which is not selected at the step S204 among the base station being not selected at the step S204.

Third Embodiment

The third embodiment of the present invention will be described in detail below. The schematic diagram showing a communication system 100 and the block diagram showing the schematic configuration of the communication system 100 are the same as FIG. 1 and FIG. 2, and thus the description thereof is omitted.

The third embodiment is an example in a case that the resource allocation which is over the maximum of the transmission power of the terminal b1 is instructed, in the uplink from the terminal b1 to the base station.

As an example, in a case that the resource allocation which is over the maximum of transmission power of terminal b1 is instructed, the terminal b1 selects the base station, and communicates with the selected base station, and stops the communication with the base station which is not selected.

Here, the terminal b1 selects the base station in accordance with the priority indicated by the stored information.

This priority is the information which indicates the priority or the predetermined priority informed by the base station.

Further, in the third embodiment, the respective base stations a1-0, a1-1, a1-2, a1-3, a1-4, and a1-5 independently allocates the resources using the radio communication with the terminal b1.

Figure 5:
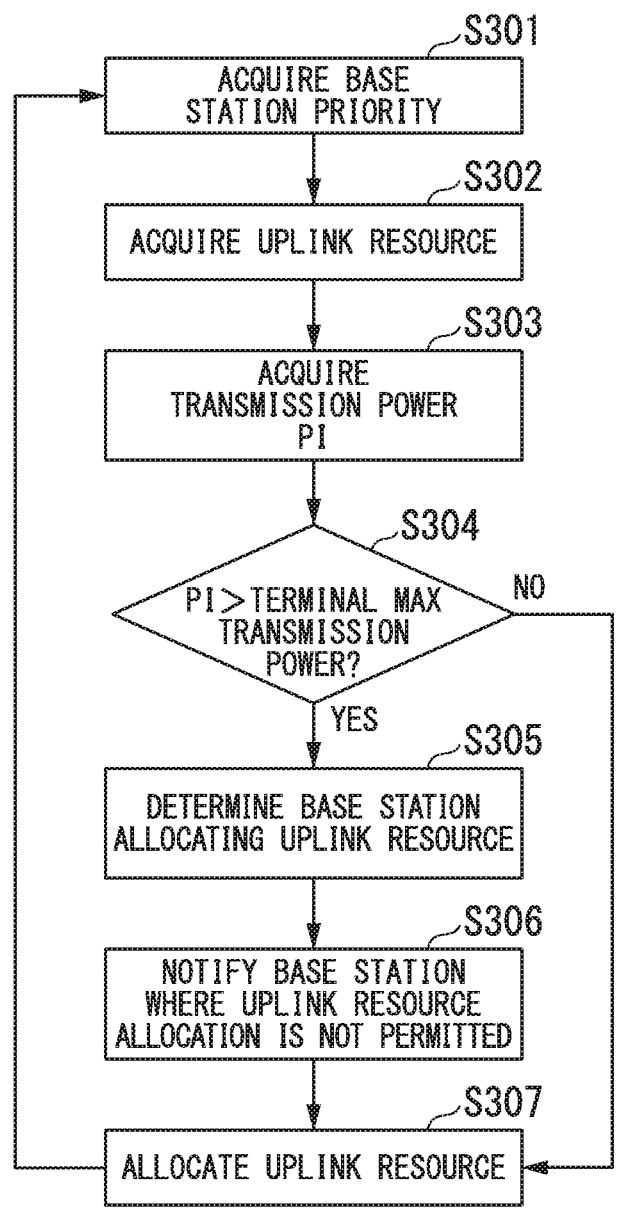
FIG. 5 is a flowchart showing an operation of a terminal in a third embodiment of the present invention.

FIG. 5 is a flowchart showing the operation of the terminal b1 in a third embodiment of the present invention.

The flowchart of the third embodiment (FIG. 5) is different from the flowchart of the first embodiment (FIG. 3) at the step S300, and the step S304-306. The processes at the other steps are same as the flowchart of the first embodiment, and thus the description thereof is omitted.

(Step S300) The information processing unit b142 acquires the information indicating a priority in accordance with a communication from the base station (for example, the macro base station a1-0) to the respective base stations a1-0, a1-1, a1-2, a1-3, a1-4, and a1-5.

The information processing unit b142 stores the acquired information to the memory unit b13. After that, the step goes to the step S101.

(Step S304) The allocation unit b143 selects one or more base stations among the base stations a1-0, a1-1, a1-2, a1-3, a1-4, and a1-5 with which the allocation unit b143 is going to communicate, according to the priority which the information stored at the step S300.

Here, the allocation unit b143 selects one or more base stations so as to the total amount of the transmission power of the communication with the selected one or more base stations, is not more than the threshold.

This threshold is the maximum transmission power which is, for example, the maximum value of the transmission power of the terminal b1. After that, the step goes to the step S305.

(Step S305) The information processing unit b142 notifies that may not allocate the signal in the resources of the uplink, that is, may not communicate with not selected base stations at the step S304 among the base stations with which the information processing unit b142 is going to communicate. After that, the step goes to the step S306.

(Step S306) The allocation control unit b144 allocates the signal on the resources, based on the first resource allocation information acquired at the step S101, and the second to sixth resource allocation information.

Here, the allocation control unit b144 allocates the signal on the resources, based on the resource allocation information of the selected base station, if the base station is selected at the step S305.

In this way, in the third embodiment, the control unit b14 stops the communications with at least more than one base station, among the base stations a1-0, a1-1, a1-2, a1-3, a1-4, and a1-5, according to the priority, if the total amount of the transmission power of all communications exceed the threshold.

In the communication system 100, the terminal b1 may prevent the resource allocation which exceeds the maximum value of the transmission power by not arranging the resources in the communication with the base station in low priority.

Fourth Embodiment

The fourth embodiment of the present invention will be described in detail below. The schematic drawings showing the communication system 100 and the block diagram showing the schematic configuration of the communication system 100 are the same as the FIG. 1 and FIG. 2, and thus the description thereof is omitted.

In the fourth embodiment, on the uplink from the terminal b1 to the base station, the base station and the management device 200 instruct the resource allocation, so as not to exceed the maximum value of the transmission power of the terminal b1.

As an example, the devices (the base station or the management unit 200) of the network side decide the distribution of the maximum transmission power of the communication between the terminal b1 and the respective base stations a1-0, a1-1, a1-2, a1-3, a1-4, and a1-5, before beginning the communication with the terminal b1.

The terminal b1 independently notifies the PHR per the distributed the max transmission power to the respective base stations a1-0, a1-1, a1-2, a1-3, a1-4, and a1-5.

The base station allocates the resources based on this information, and thereby the transmission power of the terminal b1 is controlled.

Figure 6:
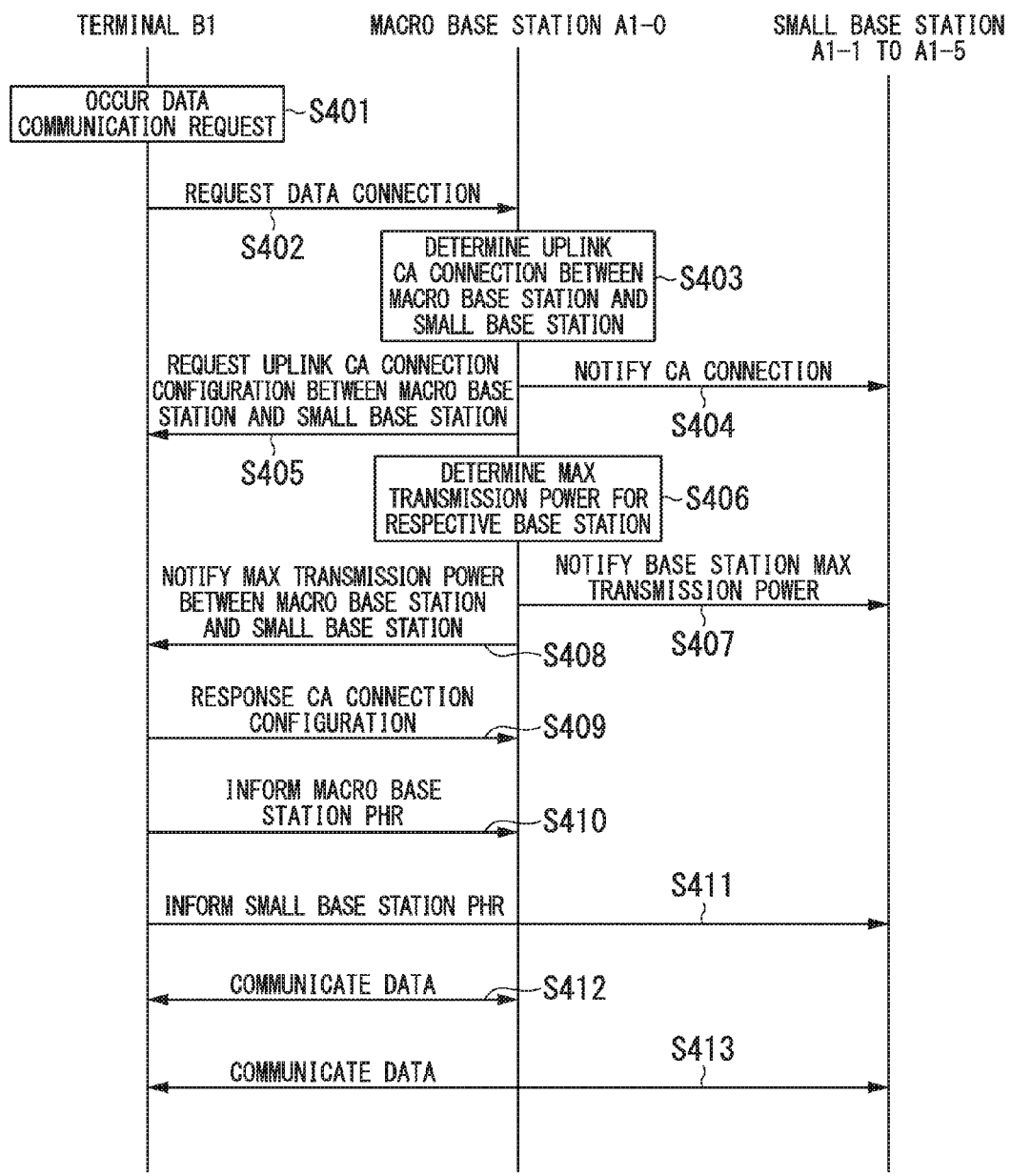
FIG. 6 is a sequence diagram showing an operation of a communication system in a fourth embodiment of the present invention.

FIG. 6 is a sequence diagram showing the operation of the communication system 100 in the fourth embodiment of the present invention. The sequence diagram illustrated in the FIG. 6 shows the performance of the CA between the terminal b1 and the macro base station a1-0, or the one or more small base station a1-i.

(Step S401) The terminal b1 is in a waiting state. In a case that a data transmission is acquired by the user operation and an application function and so on, the information processing unit b142 generates a data connection request requesting a connection to a data communication. After that, the step goes to the step S402.

(Step S402) The information processing unit b142 transmits the data connection request generated at the step S401 to the macro base station a1-0. After that, the step goes to the step S403.

(Step S403) The information acquisition unit a131 acquires the data connection request at the step S402.

In this case, the allocation unit a312 determines to execute the CA, for example, with the macro base station a1-0, and with the one or more small base stations a1-i, in the uplink.

Each of the one or more small base stations a1-i which executes the CA with the macro base station a1-i to the terminal b1 will be referred to as a "CA small base station" below. After that, the step goes to the step S404.

(Step S404) The information providing unit a133 transmits the CA connection information that indicates executing the CA with the macro base station a1-0 to the terminal b1, to the CA small base station determined at the step S403. After that, the step goes to the step S405.

(Step S405) The information providing unit a133 transmits the terminal b1 a CA connection setting request that requests the CA connection setting on the uplink, with the macro base station a1-0 and with the CA small base station determined at the step S403, to the terminal b1. After that, the step goes to the step S406.

(Step S406) The allocation unit a132 determines the transmission power of the terminal b1, in each of the communications of the macro base station a1-0 and the CA small base station.

For example, the allocation unit a132 determines the maximum transmission power of the terminal b1, in each of the communications of the macro base station a1-0 and the CA small base station.

The allocation unit a132 distributes the transmission power, and thereby, determines the maximum transmission power of each of the communications, for example, (1b) to (3b) as follows. After that the step goes to the step S407.

(1b) The allocation unit a132 determines the maximum transmission power depending on the positional relation between the macro base station a1-0 in which the terminal b1 exists and the CA small base station.

For example, the macro base station a1-0 knows the positional relation with the CA small base station, calculates a distance ratio of the distance between the terminal b1 and the macro base station a1-0 and the distance between the terminal b1 and the CA small base station.

The allocation unit a132, according to these distance ratio, determines the distribution of the maximum power. For example, the allocation unit a132 may grasp the distance between the macro base station a1-0 and the CA small base station, and a small cell radius of the CA small base stations, from the information stored in the memory unit a12, and may use these ratio as the above distance ratio.

(2b) The max transmission power of the small base station a1-$i$ is configured in advance, and is stored in the memory unit a12.

For example, the allocation unit a132 configures the max transmission power of the CA small base station to the max transmission power stored in the memory unit a12.

The allocation unit a132 configures the max transmission power of the macro base station a1-0 to a value obtained by subtracting a sum of the max transmission power (max_Psmall) of the CA small base station from the max transmission power of the terminal b1.

(3b) The allocation unit a132 equally distributes the transmission power to the macro base station a1-0 and the CA small base station.

For example, when the terminal b1 may communicate (execute the CA) simultaneously with N (N is an integer larger than 2) base stations, the allocation unit a132 configures the max transmission power of the terminals b1 with the respective base stations a1-0, a1-1, a1-2, a1-3, a1-4, and a1-5 to (P=(terminal max transmission power)/N).

(Step S407) The information providing unit a133 transmits a base station max transmission power notification indicating the max transmission power determined at the Step 406 to the CA small base station.

Here, the identification information of the terminal b1 and the max transmission power of the terminal b1 in the CA small base station which is the notification destination of the terminal b1 are included in the base station max transmission power notification. After that, the Step goes to the step S408.

(Step S408) The information providing unit a133 transmits the max transmission power notification indicating the max transmission power determined at the step S406 to the terminal b1.

Here, the identification information of the macro base station a1-0 and the CA small base station, and the information indicating the max transmission power of the respective communications with these base stations are included in the max transmission power notification. After that, the Step goes to the step S408.

(Step S409) The information processing unit b142 acquires the max transmission power at the step S408, stores it in the memory unit b13.

The setting of executing the CA complete, and thereby the information processing unit b142 transmits a CA connection configuration response to the macro base station a1-0. After that, the Step goes to the Step S410.

(Step S410) The adjustment unit b143 presumes a transmission power (referred to as a PUS transmission power) for the PUSCH transmission in the subframe.

The adjustment unit b143 calculates a difference between the max transmission power which the max transmission power notification indicates at the Step S408 and the presumed PUS transmission power as the PHR every base station a1-0, a1-1, a1-2, a1-3, a1-4, and a1-5.

Thus, the adjustment unit b143 calculates the PHR per the max transmission power notification distributed to the respective base stations a1-0, a1-1, a1-2, a1-3, a1-4, and a1-5. The adjustment unit b143 generates the PHR report indicating the calculated difference.

The adjustment unit b143 generates the PHR report about a communication with the macro base station a1-0.

The adjustment unit b143 transmits the generated PHR report to the macro base station a1-0. After that, the step goes to the step S411.

(Step S411) The adjustment unit b143 generates the PHR report about every communication with the CA small base station. The adjustment unit b143 transmits the generated PHR report to the respective CA small base stations. After that, the step goes to the step S412.

(Step S412) The allocation unit a132 of the macro base station a1-0 allocates a resource in the communication with the terminal b1, generates a resource allocation information indicating the allocated resource.

Here, the allocation unit a132 allocates the resource based on the PHR report at the step S410. The allocation control unit b144 controls the allocation of the signal in the communication with the macro base station a1-0, based on the resource allocation information generated by the allocation unit a132 of the macro base station a1-0.

Thus, the allocation control unit b144 distributes the transmission using the respective communications, and the terminal b1 communicates with the macro base station a1-0.

After that, the step goes to the step S413. Further, the allocation unit a132 may allocate the resource, not only based on the PHR report but also based on a transmission quality or a remaining data amount of the terminal (a terminal data buffer condition), and so on.

(Step S413) The allocation unit a132 of the CA small base station allocates a resource in the communication with the terminal b1, generates a resource allocation information indicating the allocated resource.

Here, the allocation unit a132 allocates the resource base on the PHR report at the Step 411. The allocation control unit b144 controls an allocation of a signal in a communication with the CA small base station, based on the resource allocation information which the allocation unit a132 of the CA small base station generated.

Thus, the allocation control unit b144 distributes the power for using in each communication, and the terminal b1 communicates with the CA small base station. After that, the step S412 and the step S413 are repeated, and it may be back to the step S410 or the step S411.

The max transmission power of each base station may be changed according to the communication data amount or the PHR report, when the max transmission power changes, the communication data amount or the PHR may be reported again. The PHR report may be reported at any time when the pass loss may change.

The PHR reports of the respective base stations a1-0, a1-1, a1-2, a1-3, a1-4, and a1-5 are independent from each other, the terminal b1 may report the PHR reports only for the base station which needs the report.

Thus, in the fourth embodiment, the control unit a13 of the macro base station a1-0 determines the allocation of the max transmission power in each communication of the terminal b1, for the communication between the respective base stations a1-0, a1-1, a1-2, a1-3, a1-4, and a1-5 and the terminal b1.

The control unit b14 generates the PHR report in the respective base stations a1-0, a1-1, a1-2, a1-3, a1-4, and a1-5 based on the transmission power of the resource allocated to the respective base stations a1-0, a1-1, a1-2, a1-3, a1-4, and a1-5 and the max transmission power determined by the control unit a13. After that, the control unit b14 reports the generated PHR report to the respective base stations a1-0, a1-1, a1-2, a1-3, a1-4, and a1-5.

The control unit b14 distributes the transmission power of the respective base stations a1-0, a1-1, a1-2, a1-3, a1-4, and a1-5.

Accordingly, the device of the network in the communication system 100 may prevent to instruct the resource allocation in exceeding the max transmission power.

Further, the terminal b1 reports the PHR to the respective base stations a1-0, a1-1, a1-2, a1-3, a1-4, and a1-5, and thus, the base stations a1-0, a1-1, a1-2, a1-3, a1-4, and a1-5 may conduct scheduling efficiently.

Fifth Embodiment

The fifth embodiment of the present invention will be described in detail below. The schematic diagram showing a communication system 100 and the block diagram showing schematic configuration of the communication system 100 are the same as FIG. 1 and FIG. 2, and thus the description thereof is omitted.

The fifth embodiment is an example in a case that at least one of the max transmission power of the respective frequency bands is different from others, as the terminal capability of the terminal b1.

Figure 7:
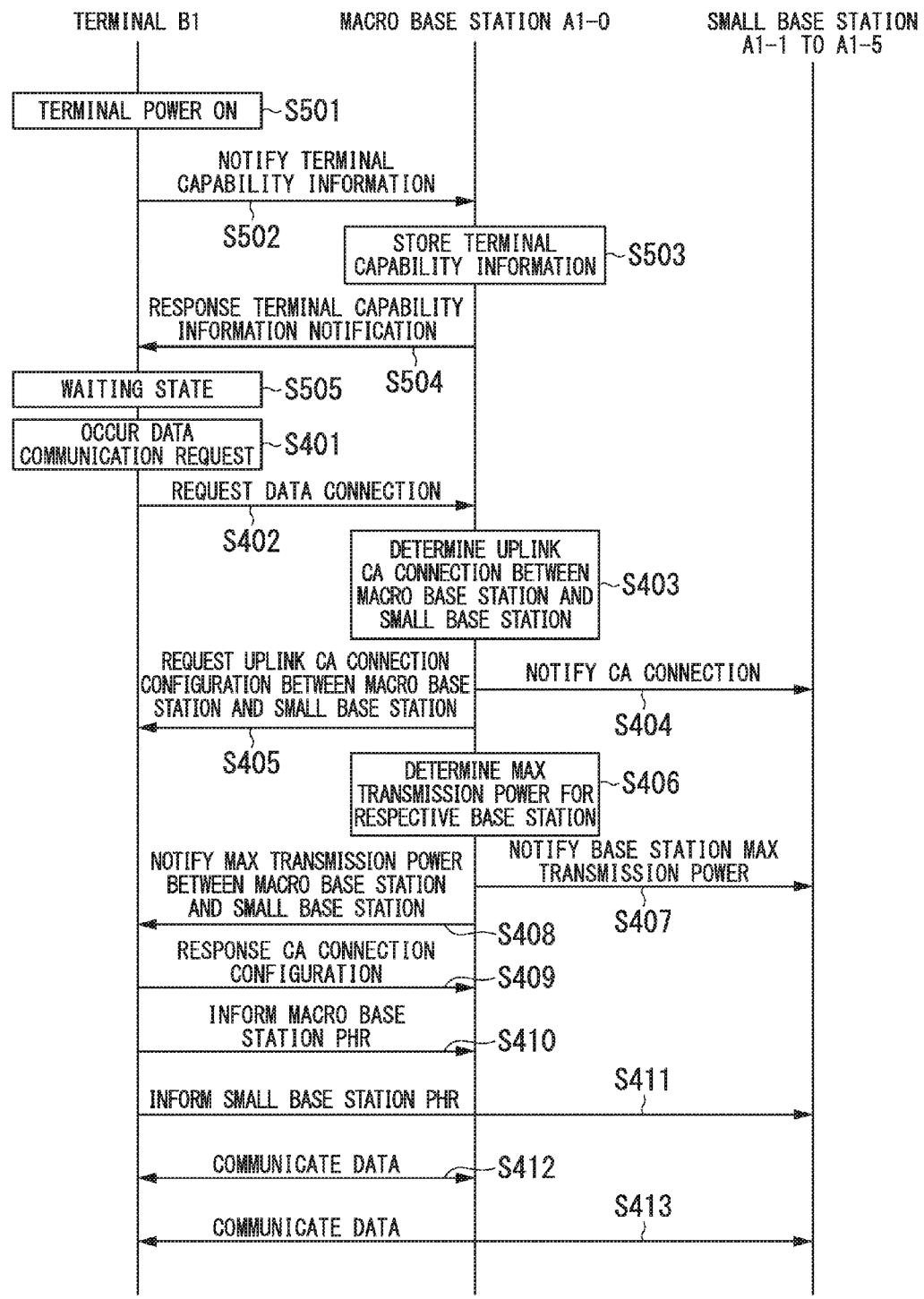
FIG. 7 is a sequence diagram showing an operation of a communication system in a fifth embodiment of the present invention.

FIG. 7 is a sequence diagram showing the operation of the communication system 100 in the fifth embodiment of the present invention.

The sequence diagram in the fifth embodiment (FIG. 7) is a case that the step S501 to S506 is different from that of the sequence diagram in the fourth embodiment (FIG. 6).

The processes at the other steps are the same as the flowchart of the first embodiment, and thus the description thereof is omitted.

(Step S501) The power resource is turned ON (Power Resource ON). After that, the step goes to the Step 502.

(Step S502) The information processing unit b142 reads the terminal capability information stored in advance in the memory unit b13, transmits a terminal capability information notification (for example, UE Capability message) including the terminal capability information to the macro base station a1-0.

The terminal capability information is an information indicating a capability of the terminal b1. The terminal capability information includes, for example, an information indicating the max transmission power of the terminal b1 in the respective frequency bands.

Further, the max transmission power in the frequency band using in the communication with the small base station a1-*i* may be configured lower than that with the macro base station a1-0.

According to this configuration, the communication system 100 may configure the max transmission power of the terminal b for transmission to the small base station a1-*i* in low, and thereby the terminal b may be simplified.

In particular, when the frequency band is determined only for the small base station a1-*i*, the max transmission power of the small base station a1-*i* may be configured lower than that of the frequency band used for the macro base station a1-0, and thereby, it is effective.

(Step S503) The information acquisition unit a131 acquires the terminal capability information at step S502, stores the terminal capability information included in the terminal capability information notification with the identification information of the terminal b1.

Thus, the memory unit a12 stores the information indicating the max transmission power of every frequency band of every terminal b1. After that, the step goes to the Step S504.

(Step S505) The information providing unit a133 transmits a terminal capability information notification acknowledgement which is the acknowledgement of the step S503. After that, the step goes to the step S505.

(Step S505) The terminal b1 reaches in a waiting state. After that, the step goes to the step S401.

(Step S506) The allocation unit a132 determines the transmission power of the terminal b1 using the respective communications of the macro base station a1-0 and the CA small base station.

For example, the allocation unit a132 determines the max transmission power of the terminal b1 in the respective communications of the macro base station a1-0 and the CA small base station.

Here, the allocation unit a132 distributes the transmission power based on the max transmission power of the respective frequency bands which the information stored at the Step S503 indicates, and determines the max transmission power of the respective communications.

For example, the allocation unit a132 determines the max transmission power, so that the max transmission power of the terminal b1 of every base station which is determined by the macro base station a1-0 enters a range of a terminal capability value of the max transmission power of the respective predetermined band.

Further, the terminal b1 may communicate simultaneously with the N1 (N1 is an integer larger than 2) base stations using the frequency band A, and may simultaneously communicate (execute the CA) with the N2 (N2 is an integer larger than 2) base stations using the frequency band B, when the max transmission power ratio of the frequency band A and the frequency band B is M-to-1, it is possible to do as follows.

Thus, in this case, the allocation unit a132 configures the max transmission power of the base stations a1-0, a1-1, a1-2, a1-3, a1-4, and a1-5 using the frequency band A to P1={(terminal max transmission power)×M/(M×N1+N2)}.

The allocation unit a132 configures the max transmission power of the base station a1-0, a1-1, a1-2, a1-3, a1-4, and a1-5 using the frequency band B to P={(terminal max transmission power)/(M×N1+N2)}.

Thus, in the fifth embodiment, the control unit a13 of the macro base station a1-0 determines the distribution of the max transmission power of the respective communications of the terminal b1, based on the information indicating the max transmission power of the terminal b1 in the respective frequency bands. Thus, the construction and configuration of the terminal b1 in the communication system 100 may be simplified Further, in every embodiment described above, the CC may be 2 or more, and for example, may be 3 or more.

In this case, the base stations using the respective CCs may be different from each other.

Further, described above, although the macro base station may determine a priority of the base station being selected and a determination of the max transmission power of the terminal to the respective base stations, the small base station or a core network may determine them.

Further, in the respective embodiments described above, to determine the max transmission power may be to determine a correction value of the max transmission power. Here, the correction value means a reference value of the predetermined reference value.

Referring to the drawings, the respective embodiments of the invention is described above in detail, the specific configuration is not limited to the configurations described above, and the configuration may be changeable in the range of not exceeding to the gist of the invention.

INDUSTRIAL APPLICABILITY

The present invention is applicable to the communication system, the terminal apparatus and the communication method in which the transmission power of the terminal is required to manage.

DESCRIPTION OF REFERENCE NUMERALS a1-$i$ ($i=1, 2, \ldots$) small base station
b1 terminal
a11 communication unit
a12 memory unit
a13 control unit
a14 downlink transmission unit
a15 uplink receiving unit
a131 information acquisition unit
a132 allocation unit
a133 information providing unit
b11 input unit
b12 output unit
b13 memory unit
b14 control unit
b15 downlink receiving unit
b16 uplink receiving unit
b141 power information acquisition
b142 information processing unit
b143 adjustment unit
b144 allocation control unit
b151 first downlink receiving unit
b152 second downlink receiving unit
b161 first uplink transmission unit
b162 second uplink transmission unit
C10, C11, C12, C13, C14, C15 cell
100 communication system
200 management device

The invention claimed is:

1. A communication system comprising:
a first base station apparatus;
a second base station apparatus; and
a mobile station apparatus, wherein
the mobile station apparatus includes:
communication circuitry that
executes a first communication using a first frequency band over the first base station apparatus; and
executes a second communication using a second frequency band that differs from the first frequency band over the second base station;
the first communication and the second communication are simultaneously executed, and
control circuitry that:
acquires, from the first base station apparatus, first resource allocation information associated with the first communication,
acquires, from the second base station apparatus, second resource allocation information associated with the second communication,
estimates the first transmission power based on the first resource allocation information acquired,
estimates the second transmission power based on the second resource allocation information acquired,
calculates a first correction value by subtracting a first fixed value or a first fixed proportion from the first transmission power estimation value estimated,
calculates a second correction value by subtracting a second fixed value or a second fixed proportion from the second transmission power estimation value estimated,
adjusts the first transmission power based on the first correction value calculated, and
adjusts the second transmission power based on the second correction value calculated,
the calculations of the first and second correction values are performed such that a total sum of the first and second correction values is lower than a threshold, and
the calculations of the first and second correction values are performed in a case that the total sum is higher than the threshold.

2. The communication system according to claim 1, wherein
the control circuitry stops at least either one of the first and second communications in a case that the total sum is higher than the threshold.

3. The communication system according to claim 1, wherein the communication system further comprises:
a management apparatus, wherein
the first base station apparatus, the second base station apparatus, or the management apparatus include:
base station control circuitry that adjusts a first max transmission power of the first communication and a second max transmission power of the second communication,
the control circuitry generates a first transmission power condition information indicating a first condition of the first transmission power based on the first transmission power and the first max transmission power adjusted by the base station control circuitry, and transmits the first transmission power condition information to the first base station apparatus, and the control circuitry generates a second transmission power condition information indicating a second condition of the second transmission power based on the second transmission power and the second max transmission power adjusted by the base station control circuitry, and transmits the second transmission power condition information to the second base station apparatus.

4. A mobile station apparatus comprising:

communication circuitry that simultaneously executes a first communication with a first base station apparatus over a first frequency band and a second communication with a second base station apparatus which is different from the first base station apparatus over a second frequency band which is different from the first frequency band; and control circuitry that:
acquires, from the first base station apparatus, a first resource allocation information associated with the first communication,
acquires, from the second base station apparatus, a second resource allocation information associated with the second communication,
estimates the first transmission power based on the first resource allocation information acquired,
estimates the second transmission power based on the second resource allocation information acquired,
calculates a first correction value by subtracting a first fixed value or a first fixed proportion from the first transmission power estimation value estimated,
calculates a second correction value by subtracting a second fixed value or a second fixed proportion from the second transmission power estimation value estimated,
adjusts the first transmission power based on the first correction value calculated, and
adjusts the second transmission power based on the second correction value calculated, the calculations of the first and second correction values are performed such that a total sum of the first and second correction values is lower than a threshold, and the calculations of the first and second correction values are performed in a case that the total sum is higher than the threshold.

5. A communication method performed by a mobile station apparatus, the communication method comprising:

executing simultaneously a first communication with a first base station apparatus over a first frequency band and a second communication with a second base station apparatus which is different from the first base station apparatus over a second frequency band which is different from the first frequency band;

acquiring, from the first base station apparatus, a first resource allocation information associated with the first communication;

acquiring, from the second base station apparatus, a second resource allocation information associated with the second communication;

estimating the first transmission power based on the first resource allocation information acquired;

estimating the second transmission power based on the second resource allocation information acquired;

calculating a first correction value by subtracting a first fixed value or a first fixed proportion from the first transmission power estimation value estimated;

calculating a second correction value by subtracting a second fixed value or a second fixed proportion from the second transmission power estimation value estimated, adjusting the first transmission power based on the first correction value calculated; and adjusting the second transmission power based on the second correction value calculated, wherein the calculations of the first and second correction values are performed such that a total sum of the first and second correction values is lower than a threshold, and the calculations of the first and second correction values are performed in a case that the total sum is higher than the threshold.

* * * * *